United States Patent
Shimizu et al.

(10) Patent No.: US 12,198,383 B2
(45) Date of Patent: Jan. 14, 2025

(54) CAMERA PARAMETER ESTIMATION APPARATUS, CAMERA PARAMETER ESTIMATION METHOD, AND CAMERA PARAMETER ESTIMATION PROGRAM

(71) Applicant: NIPPON TELEGRAPH AND TELEPHONE CORPORATION, Tokyo (JP)

(72) Inventors: Shinya Shimizu, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/769,579

(22) PCT Filed: Nov. 8, 2019

(86) PCT No.: PCT/JP2019/043796
§ 371 (c)(1),
(2) Date: Apr. 15, 2022

(87) PCT Pub. No.: WO2021/090467
PCT Pub. Date: May 14, 2021

(65) Prior Publication Data
US 2024/0127479 A1  Apr. 18, 2024

(51) Int. Cl.
*G06T 7/80* (2017.01)
*G06T 7/215* (2017.01)
(Continued)

(52) U.S. Cl.
CPC .............. *G06T 7/80* (2017.01); *G06T 7/215* (2017.01); *G06T 7/246* (2017.01); *G06T 7/292* (2017.01);
(Continued)

(58) Field of Classification Search
CPC .......... G06T 7/80; G06T 7/215; G06T 7/246; G06T 7/292; G06T 2207/10016;
(Continued)

(56) References Cited

U.S. PATENT DOCUMENTS

| | | | |
|---|---|---|---|
| 11,373,318 B1 * | 6/2022 | McKennoch | G06V 20/52 |
| 2011/0255747 A1 | 10/2011 | Iwasaki et al. | |
| 2019/0147621 A1 * | 5/2019 | Alesiani | G06T 7/73 382/190 |

FOREIGN PATENT DOCUMENTS

| | | |
|---|---|---|
| JP | 201941261 A | 3/2019 |
| WO | WO-2011080900 A1 | 7/2011 |

OTHER PUBLICATIONS

Takahashi et al., Human Pose as Calibration Pattern; 3D Human Pose Estimation with Multiple Unsynchronized and Uncalibrated Cameras, Jun. 2018, 2018 IEEE/CVF Conference on Computer vision and Pattern Recognition Workshops (CVPRW) (Year: 2018).*

(Continued)

*Primary Examiner* — Said M Elnoubi (57) ABSTRACT

A camera parameter estimating device includes an obtaining unit which obtains time series frames including a plurality of subject images existing in a common field of vision shared by multiple cameras for each of the cameras, a point estimating unit which estimates the coordinates of a joint point determined in the subject image in the time-series frame for each of the subject images, a motion trajectory estimating unit which estimates the trajectory of the joint point between the time-series frames for each of the cameras, an inter-camera correspondence estimating unit which estimates a group of the trajectories between the frames obtained respectively from a pair of the cameras, and a parameter estimating unit which estimates a camera parameter for each of the cameras according to the group of trajectories.

17 Claims, 5 Drawing Sheets

(51) Int. Cl.
*G06T 7/246* (2017.01)
*G06T 7/292* (2017.01)

(52) U.S. Cl.
CPC ............... *G06T 2207/10016* (2013.01); *G06T 2207/30241* (2013.01)

(58) Field of Classification Search
CPC ........... G06T 2207/30241; G06T 2207/30244; G01B 11/245; G01C 3/00; G01C 3/06
See application file for complete search history.

(56) References Cited

OTHER PUBLICATIONS

Kosuke Takahashi et al., Human Pose as Calibration Pattern; 3D Human Pose Estimation with Multiple Unsynchronized and Uncalibrated Cameras, 2018 IEEE/CVF Conference on Computer Vision and Pattern Recognition Workshops (CVPRW), Jun. 18, 2018.
Zhe Cao et al., Realtime Multi-Person 2D Pose Estimation using Part Affinity Fields, 2017 IEEE Conference on Computer Vision and Pattern Recognition (CVPR), Jul. 21, 2017.
Kosuke Takahashi et al., Extrinsic Camera Calibration from Human Joints, IPSJ SIG Technical Reports, vol. 2017-CG-168, No. 30, 2017, pp. 1-8.

* cited by examiner

CAMERA PARAMETER ESTIMATION APPARATUS, CAMERA PARAMETER ESTIMATION METHOD, AND CAMERA PARAMETER ESTIMATION PROGRAM

CROSS-REFERENCE TO RELATED APPLICATIONS

This application is a 371 U.S. National Phase of International Application No. PCT/JP2019/043796, filed on Nov. 8, 2019. The entire disclosure of the above application is incorporated herein by reference.

TECHNICAL FIELD

The invention relates to a camera parameter estimating device, a camera parameter estimating method, and a camera parameter estimating program.

BACKGROUND ART

The performance of a person in an event such as a sporting event can be analyzed by estimating the three-dimensional positions of joints of the person. The estimated three-dimensional positions may be based to recreate some scenes in the event for example in computer graphics. This allows the user to watch the recreated scenes.

According to a method, the result of motion capture obtained using a reflection marker or an inertia sensor is based to estimate the three-dimensional position of the joints of a person. According to another method, a moving image with multiple viewpoints obtained using multiple cameras is based to estimate the three-dimensional position of the joints of a person.

A wearable motion capture system can estimate the three-dimensional position of the joints of a subject highly accurately. However, the subject needs to wear a special device. When for example the subject is an athlete participating in a game, or when the subject includes an indefinite number of people, the wearable motion capture system cannot be used.

According to a method for estimating three-dimensional positions on the basis of multi-viewpoint moving images captured using multiple cameras, triangulation is carried out on the basis of the two-dimensional coordinates of joint positions in moving images captured by the cameras. Triangulation requires an external parameter indicating the position of each of the cameras, an internal parameter indicating for example the focal length of the lens, and a lens distortion parameter.

Hereinafter, to derive a camera parameter will be referred to as "camera calibration". To derive an external parameter for the camera will be referred to as "external calibration".

Methods for external calibration include a method carried out by referring to a reference object (an object having a known structure) provided in a common field of vision shared by multiple cameras (reference document 1: Zhengyou Zhang, "A Flexible New Technique for Camera Calibration", IEEE Transactions on Pattern Analysis and Machine Intelligence, Vol. 22, Issue 11, pp. 1330-1334, November 2000) and a method carried out according to correspondence among feature points (natural feature points) determined on the surface of an object existing in a common field of vision shared by multiple cameras (reference document 2: Sameer Agarwal, et al., "Building Rome in a Day", Communications of the ACM, Vol. 54, Issue 10, pp. 105-112, October 2011).

However, when the operation of an athlete participating in a game is analyzed, it is difficult to provide a reference object (such as a chess board) in a common field of vision shared by multiple cameras. The feature quantity of a natural feature point is likely to change for example according to the direction of a camera. For example, a natural feature point captured from the direct front of a subject is greatly different from a natural feature point captured from a side of the subject in the image feature quantity of these feature points. Therefore, it is difficult to derive corresponding points on the basis of such natural feature points.

As for these problems, NPL 1 suggests that the positions of joints of a person whose images are captured by multiple cameras are used as corresponding points, and external parameters for the cameras are estimated on the basis of the coordinates of joint images in a two-dimensional image. According to the method, it is not necessary to provide any reference object. A human-type three-dimensional model having joints is commonly used for multiple cameras instead of natural feature points. Therefore, corresponding points can be derived even when how the person looks in a two-dimensional image is greatly different among the cameras.

NPL 2 describes a method for learning the positions of joints of a person in a two-dimensional image and estimating the positions of the joints on the basis of the result of learning.

CITATION LIST

Non Patent Literature

[NPL 1] Kosuke Takahashi, et al., "Human Pose as Calibration Pattern; 3D Human Pose Estimation with Multiple Unsynchronized and Uncalibrated Cameras", IEEE, CVSports (CVPRW), June 2018.

[NPL 2] Zhe Cao, et al., "Realtime Multi-Person 2D Pose Estimation Using Part Affinity Fields", 2017 IEEE Conference on Computer Vision and Pattern Recognition (CVPR), pp. 1302-1310, 2017.

SUMMARY OF THE INVENTION

Technical Problem

However, when multiple subjects exist in a common field of vision shared by the multiple cameras, images of joint points for each subject exist in each frame of the moving image. In this case, the camera parameter estimating device cannot estimate camera parameters unless information indicating which joint point is the joint point of each subject in each frame is given to the camera parameter estimating device by complicated manual operation on all the subjects captured in each frame of the moving image.

In view of the foregoing, it is an object of the present invention to provide a camera parameter estimating device, a camera parameter estimating method, and a camera parameter estimating program which allow camera parameters to be estimated with at least a prescribed accuracy level even when multiple subjects exist in a common field of vision shared by multiple cameras.

Means for Solving the Problem

A camera parameter estimating device according to one aspect of the invention includes an obtaining unit which obtains time series frames including a plurality of subject images existing in a common field of vision shared by multiple cameras for each of the cameras, a point estimating unit which estimates coordinates of a joint point determined in the subject image in the time-series frame for each of the subject images, a motion trajectory estimating unit which estimates the trajectory of the joint point between the time-series frames for each of the cameras, an inter-camera correspondence estimating unit which estimates a group of the trajectories between the frames obtained respectively from a pair of the cameras, and a parameter estimating unit which estimates a camera parameter for each of the cameras according to the group of trajectories.

Effects of the Invention

According to the invention, camera parameters can be estimated with at least a prescribed accuracy level even when multiple subjects exist in a common field of vision shared by multiple cameras.

DESCRIPTION OF EMBODIMENTS

An embodiment of the invention will be described in detail in conjunction with the accompanying drawings.

Figure 1:
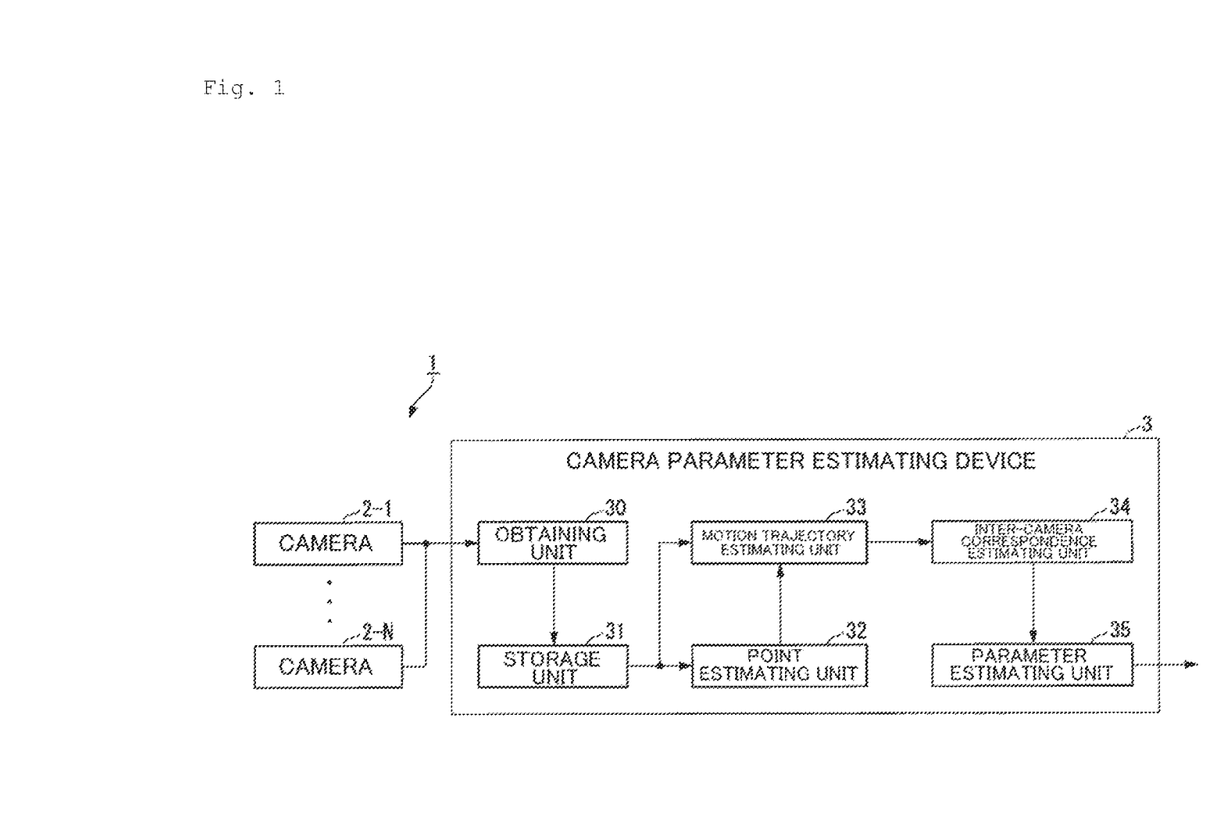
FIG. 1 is a diagram of an exemplary configuration of a camera parameter estimating system according to an embodiment of the invention.

FIG. 1 is view of an exemplary configuration of a camera parameter estimating system 1. The camera parameter estimating system 1 estimates camera parameters about multiple cameras. The camera parameters include external parameters, internal parameters, and a lens distortion parameter. The external parameters represent the position and direction (attitude) of the camera and may include parameters which represent a translation vector representing the position of the camera and a rotation matrix representing the attitude of the camera. The internal parameters may include a value representing a focal length, a value representing the position of an optical center (a principal point), and a parameter representing a shear coefficient.

The camera parameter estimating system 1 includes multiple cameras 2 and a camera parameter estimating device 3. The positions and directions of the cameras 2 are different among the cameras 2. Instead of a physical camera 2 connected to an obtaining unit 30, a storage device having captured video images recorded therein may be connected to the obtaining unit 30. In this case, a storage device is not necessary for each of the cameras, and a moving image recorded for each of the cameras may be output to the obtaining unit 30 from a single storage device.

The camera parameter estimating device 3 estimates camera parameters for the multiple cameras. The camera parameter estimating device 3 has the obtaining unit 30, a storage unit 31, a point estimating unit 32, a motion trajectory estimating unit 33, an inter-camera correspondence estimating unit 34, and a parameter estimating unit 35.

Figure 2:
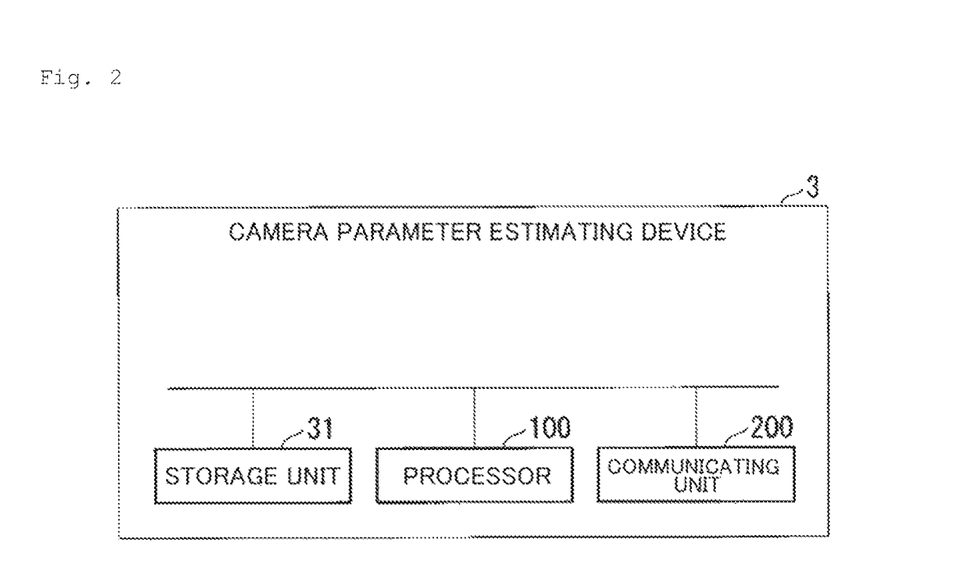
FIG. 2 is a diagram of an exemplary hardware configuration in a camera parameter estimating device according to the embodiment.

FIG. 2 is a diagram of an exemplary hardware configuration of the camera parameter estimating device 3. The camera parameter estimating device 3 includes the storage unit 31, a processor 100, and a communicating unit 200.

Some or all of the obtaining unit 30, the point estimating unit 32, the motion trajectory estimating unit 33, the inter-camera correspondence estimating unit 34, and the parameter estimating unit 35 are implemented as software as the processor 100 such as a CPU (Central Processing Unit) executes a program stored in the storage unit 31 having a non-volatile recording medium (a non-transitory recording medium). The program may be recorded on a computer-readable recording medium. The computer-readable recording medium may be a portable medium such as a flexible disk, a magneto-optical disk, a ROM (Read Only Memory), and a CD-ROM (Compact Disc Read Only Memory) or a non-transitory recording medium such as a storage device such as a hard disk built in a computer system. The program may be received by the communicating unit 200 through a telecommunication line.

Some or all of the obtaining unit 30, the point estimating unit 32, the motion trajectory estimating unit 33, the inter-camera correspondence estimating unit 34, and the parameter estimating unit 35 may be implemented by hardware including an electronic circuit (or circuitry) including for example an LSI (Large Scale Integration Circuit), an ASIC (Application Specific Integrated Circuit), a PLD (Programmable Logic Device) or an FPGA (Field Programmable Gate Array).

Referring back to FIG. 1, the camera parameter estimating system 1 will be further described.

The cameras 2 generate time-series frames. Each of the frames may be a two-dimensional image which constitutes a moving image, or a two-dimensional image which is a series of consecutive still images. The cameras 2 capture images of a plurality of subjects existing in a common field of vision shared by the multiple cameras 2 (hereinafter referred to as the "common field of vison"). The multiple cameras 2 capture the common field of vision in different directions, so that the multiple cameras 2 generate time-series frames for the common field of vision from different viewpoints.

The subject is not limited to a specific object and can be anything which is semantically definable and has a feature point which can be detected in the image such as a joint. For example, the subject may be a person, a life form such as a vertebrate with a joint structure different from a human body, a robot (such as an android), a sail used for sailing or windsurfing, or a wheelchair.

A three-dimensional model common among the multiple cameras 2 is considered for the subject. For example, when the subject is a person, a human-type three-dimensional model with joints is considered. In other words, joint points of the human-type three-dimensional model are detected as feature points from an image of the subject.

The obtaining unit 30 obtains a plurality of time-series frames for each of the cameras 2. In this way, the obtaining unit 30 obtains multi-viewpoint time-series frames from the multiple cameras 2. The frames generated by different cameras 2 are synchronized with one another in terms of shooting time. More specifically, frames assigned with the same frame number in different cameras 2 are frames captured at the same time. The storage unit 31 stores the multiple time series frames for each of the cameras 2.

The point estimating unit 32 estimates, for each image of the subject, the coordinates of at least one joint point determined in the image of the subject in the time series frames.

The motion trajectory estimating unit 33 estimates, for each of the cameras 2, the trajectory of the joint point (two-dimensional coordinates) between the time series frames. The motion trajectory estimating unit 33 estimates the trajectory of the image of each subject between the time series frames on the basis of the trajectory of the joint point between the time series frames.

Figure 3:
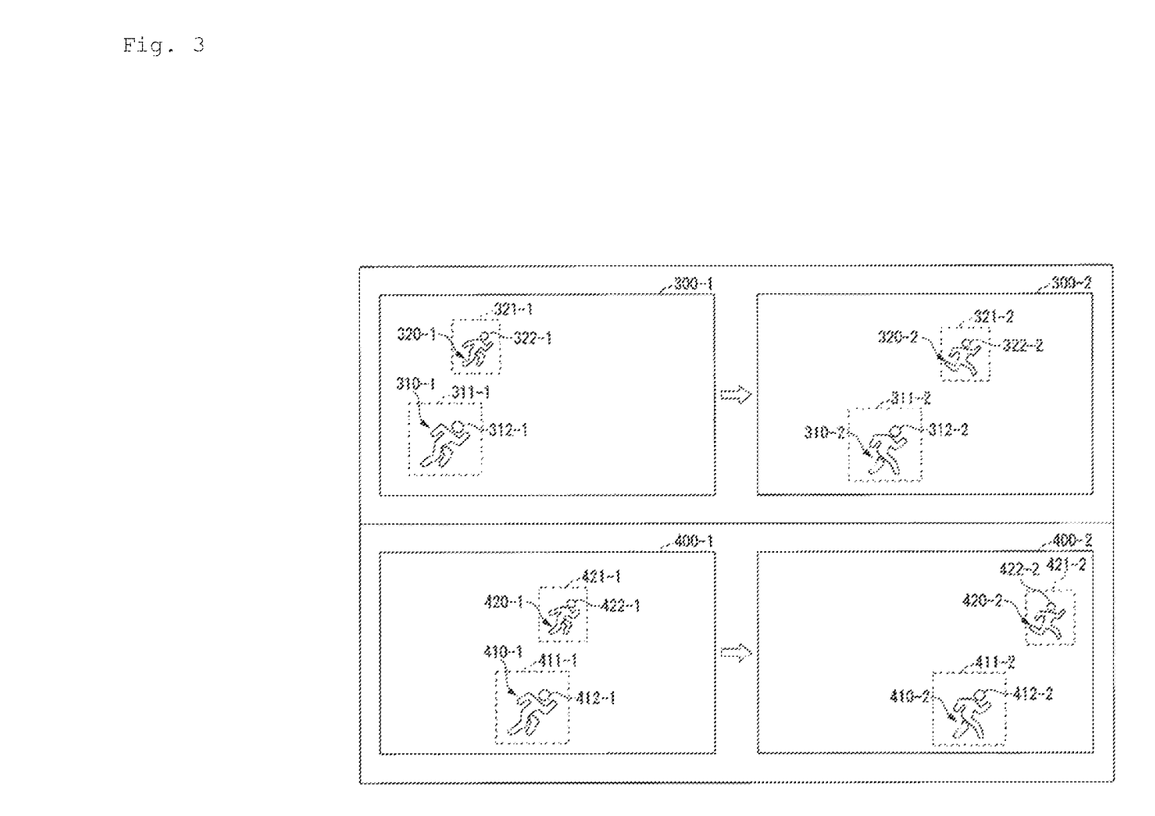
FIG. 3 is a view of exemplary trajectories according to the embodiment.

FIG. 3 is view of an example of the trajectory. As an example, frames 300-1 and 300-2 are time-series frames obtained from a camera 2-1. Frames 400-1 and 400-2 are time-series frames obtained from a camera 2-N. The frame 300-1 and the frame 400-1 are frames captured at the same time. The frame 300-2 and the frame 400-2 are frames captured at the same time. The area in the frame which includes an image of the subject will be hereinafter referred to as the "subject area". The subject area encompasses each joint point determined in the image of the subject.

The frame 300 includes subject areas 311 and 321. The subject area 311 includes a subject image 310. The subject image 310 is an image of a person. A joint point 312 is determined in the subject image 310. The subject area 321 includes a subject image 320. The subject image 320 is an image of a person different from the person in the subject image 310. A joint point 322 is determined in the subject image 320.

As for the camera 2-1, information representing the trajectory of the joint points of the subject image 310 includes a camera identifier "2-1", a start frame number "300-1", the coordinates (two-dimensional) of a joint point 312-1, an end frame number "300-2", and the coordinates (two-dimensional) of a joint point 312-2. In the following description, the information representing the trajectory of the joint point further includes the coordinates of the joint point in each frame from the start frame to the end frame.

As for the camera 2-1, information representing the trajectory of the joint point of the subject image 320 includes a camera identifier "2-1", a start frame number "300-1", the coordinates (two-dimensional) of a joint point 322-1, an end frame number "300-2", and the coordinates (two-dimensional) of a joint point 322-2.

The frame 400 includes subject areas 411 and 421. The subject area 411 includes a subject image 410. The subject image 410 is an image of the same person as the person in the subject image 310. A joint point 412 is determined in the subject image 410. The subject area 421 includes a subject image 420. The subject image 420 is an image of the same person as the person in the subject image 320. A joint point 422 is determined in the subject image 420.

As for the camera 2-N, information representing the trajectory of the joint point in the subject image 410 includes a camera identifier "2-N", a start frame number "400-1", the coordinates (two-dimensional) of a joint point 412-1, an end frame number "400-2", and the coordinates (two-dimensional) of a joint point 412-2.

As for the camera 2-N, information representing the trajectory of the joint point in the subject image 420 includes a camera identifier "2-N", a start frame number "400-1", the coordinates (two-dimensional) of the joint point 422-1, an end frame number "400-2", and the coordinates (two-dimensional) of a joint point 422-2.

Referring back to FIG. 1, the camera parameter estimating system 1 will be further described.

The inter-camera correspondence estimating unit 34 estimates the correspondence of the trajectory of the subject between the frames generated respectively by the multiple cameras 2 between the cameras. In other words, the inter-camera correspondence estimating unit 34 estimates a group of trajectories (correspondence tracks) of the joint point of the same subject among the frames obtained respectively from the cameras 2. The inter-camera correspondence estimating unit 34 may also estimate a set of trajectory groups (a corresponding track set).

The inter-camera correspondence estimating unit 34 derives a fundamental matrix between pairs of cameras 2 on the basis of the group of trajectories. The inter-camera correspondence estimating unit 34 may update the group of trajectories on the basis of the derived fundamental matrix.

The inter-camera correspondence estimating unit 34 may derive the fundamental matrix between a pair of the cameras 2 on the basis of a set of trajectory groups. The inter-camera correspondence estimating unit 34 may update the set of trajectory groups on the basis of the derived fundamental matrix.

The parameter estimating unit 35 estimates the camera parameters for each of the cameras 2 on the basis of a group of trajectories. In other words, the parameter estimating unit 35 performs camera calibration on the basis of the group of trajectories. The parameter estimating unit 35 may estimate camera parameters for each of the cameras 2 on the basis of the updated group of trajectories.

The parameter estimating unit 35 may estimate the camera parameters for each of the cameras 2 on the basis of a set of trajectory groups. In other words, the parameter estimating unit 35 may perform camera calibration on the basis of the set of trajectory groups. The parameter estimating unit 35 may estimate camera parameters for each of the cameras 2 on the basis of the set of updated trajectory groups.

Now, exemplary operation by the camera parameter estimating device 3 will be described.

Figure 4:
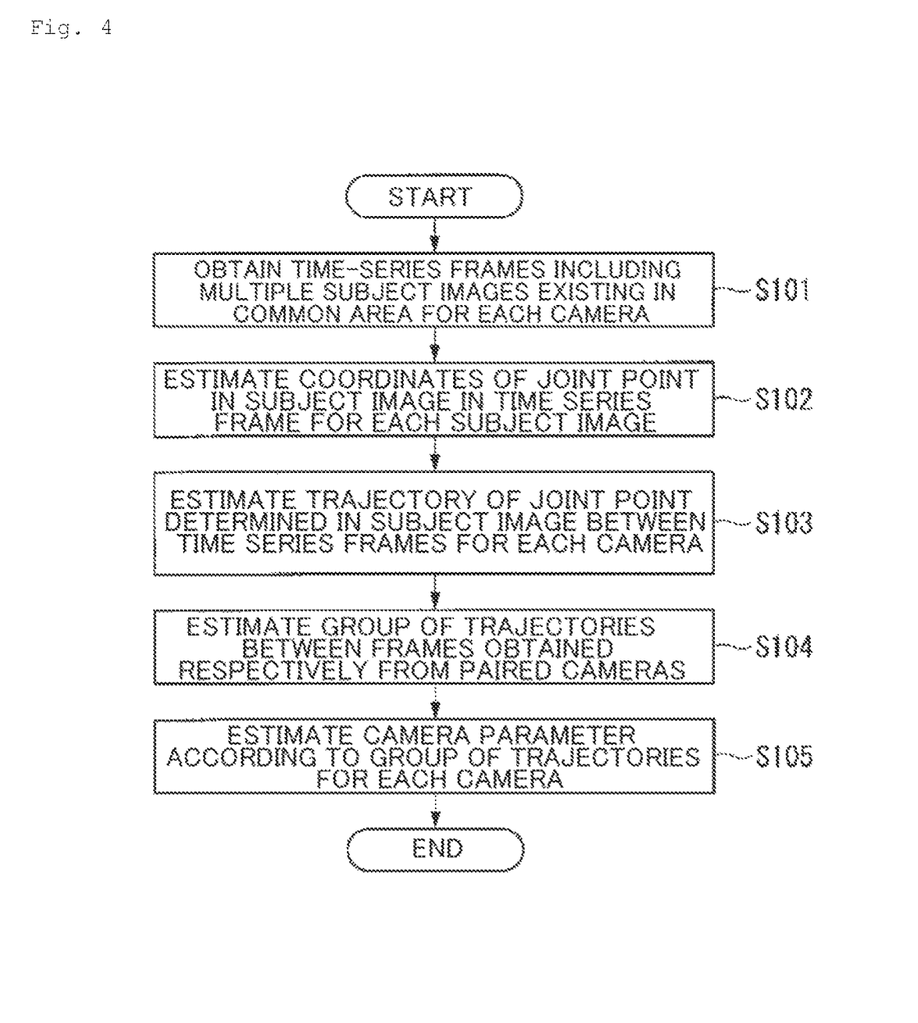
FIG. 4 is a flowchart for illustrating exemplary operation by the camera parameter estimating device according to the embodiment.

FIG. 4 is a flowchart for illustrating exemplary operation by the camera parameter estimating device 3 (exemplary camera calibration). The obtaining unit 30 obtains a plurality of time-series frames including an image of a plurality of subjects existing in a common area for each of the cameras 2, and the storage unit 31 stores the plurality of time-series frames for each of the cameras 2 (step S101).

The point estimating unit 32 estimates the coordinates (two-dimensional) of the joint point of the subject in the images in the time series frames for each image of the subject (step S102). The method for estimating the coordinates of the joint point is not limited to any particular method.

For example, as described in NPL 2, a neural network may learn how to estimate the coordinates of a joint point using a correct set of data on the two-dimensional position of the joint. The two-dimensional position of the joint in the correct data set is determined manually by a person. The learned neural network estimates the coordinates of the joint point in the image of the subject in the time-series frames.

For example, the point estimating unit 32 may estimate a subject area. The point estimating unit 32 may estimate the coordinates of the joint point in a frame for each subject area.

The definitions of the number and positions of joint points may be arbitrarily defined. In the processing for estimating the coordinates of the joint points, the definitions of the number and positions of the joint points are not changed.

The motion trajectory estimating unit 33 estimates the trajectory of the joint point determined in the image of the subject between the time series frames for each of the cameras 2 (step S103). In other words, the motion trajectory estimating unit 33 estimates the correspondence of the images of the subject between the time series frames for each of the cameras 2. The motion trajectory estimating unit 33 connects the coordinates (two-dimensional) of the joint point estimated in step S102 for each combination of a camera and a subject on the time series.

The method for estimating the trajectory of the joint point (the correspondence between the time series frames of the subject) between the time series frames is not limited to any particular method. For example, the motion trajectory estimating unit 33 derives a degree of similarity or deviation between subjects for each pair of images of the subject between the time-series frames. The motion trajectory estimating unit 33 estimates the trajectory of the joint point so that the total value of the similarity degrees is maximized. The motion trajectory estimating unit 33 may estimate the trajectory of the joint point so as to minimize the total value of the degrees of deviation.

Maximization of the total value of similarity degrees and minimization of the total value of deviation degrees can be defined as a maximum matching problem for a bipartite graph. Therefore, the motion trajectory estimating unit 33 may derive the exact solution for the total value of the degrees of similarity or deviation using various algorithms based on the maximum-flow minimum-cut theorem. The motion trajectory estimating unit 33 may derive an approximate solution for the total value of the degrees of similarity or deviation using a greedy method.

Here, the definition of the degree of similarity or deviation may be arbitrary. For example, the degree of similarity may be defined as the number (area) of pixels where subject areas overlap between time-series frames. The degree of similarity may also be defined as the ratio of the number (area) of pixels where subject areas overlap to the total area of the number (area) of pixels where subject areas overlap and the number (area) of pixels where subject areas do not overlap.

The shape of the subject area is, for example, a rectangle. The shape of the subject area may be defined on the basis of the result of estimation of the area of the subject image by semantic segmentation. In estimating the coordinates (two-dimensional) of the joint points in step S102, the estimation of the coordinates of some of the joint points may be unsuccessful. Therefore, when the shape of the subject area is rectangular, the shape of the subject area may be defined only on the basis of the joint points that are common between each pair of images of the subject among the time series frames.

When the number of joint points which are common between each pair of subject images among the time series frames is less than a certain number, the similarity degree for the pair of subject images may be set as a minimum similarity degree. When no specific joint points are common among the time series frames, the similarity degree for the pair of subject images may be set as a minimum similarity degree. In the following description, specific joint points refer to joint points with high trajectory estimation accuracy such as the neck, the hip, and the head of a human body.

The degree of deviation may be defined using the sum, average, maximum or minimum value of the distance between the same joint point in a pair of images of the subject between time-series frames. The distance between the same joint points is an arbitrarily defined distance such as a Euclidean distance, a squared distance (L2 norm), or a Manhattan distance. When the degree of deviation is derived between particular time-series frames, a common definition is used.

The motion trajectory estimating unit 33 may use the estimation accuracy or reliability of the coordinates of each joint point. The motion trajectory estimating unit 33 may weight the distance between the joint points. The weight is smaller for a higher estimation accuracy or reliability and larger for a lower estimation accuracy or reliability. The method for deriving the estimation accuracy and reliability is not limited to any specific derivation method but they may be derived as values from the Confidence Map in estimating the joint points for example as described in NPL 2. The motion trajectory estimating unit 33 may derive the degree of deviation only for the joint points having an estimation accuracy or reliability equal to or higher than a certain level.

In the step of estimating the coordinates (two-dimensional) of the joint points in step S102, the estimation of the coordinates of some of the joint points may be unsuccessful. Therefore, the motion trajectory estimating unit 33 may derive the degree of deviation only for the joint points whose coordinates have been estimated. The motion trajectory estimating unit 33 may use the distance between the joint points for which the estimation of the coordinates of the joint points fails for one or both of the time series frames as a prescribed maximum distance. Note that the motion trajectory estimating unit 33 cannot use a simple sum of distances when deriving the degree of deviation by excluding the joint points whose coordinates are not estimated.

When the number of joint points which are common between each pair of subject images among time series frames is less than a certain number, the motion trajectory estimating unit 33 may set the degree of deviation for the pair of subject images as a maximum degree of deviation. When no specific joint points are common among the time series frames, the motion trajectory estimating unit 33 may set the degree of deviation of the pair of the subject images as a maximum degree of deviation.

Instead of deriving the degree of similarity or deviation on the basis of the coordinates (two-dimensional) of the joint points in the frames, the motion trajectory estimating unit 33 may derive the degree of similarity or deviation on the basis of image signals (image feature quantities) between joint points in the pair of subject images. For example, the motion trajectory estimating unit 33 derives an image feature quantity vector for each joint point. The motion trajectory estimating unit 33 may derive the degree of similarity or deviation on the basis of the distance between the image feature quantity vectors. The image feature quantity vector may be a Scale Invariant Feature Transform (SIFT), a Histogram of oriented gradient (HOG) or Speeded-Up Robust Features (SURF).

The motion trajectory estimating unit 33 may derive the degree of similarity or deviation on the basis of image signals between joint points in a pair of subject images only for the joint points whose coordinates have been estimated. The motion trajectory estimating unit 33 may weight the degree of similarity or deviation on the basis of the image signals between the joint points in the pair of subject images using the estimation accuracy or reliability of the coordinates of each joint point. The motion trajectory estimating unit 33 may derive the degree of similarity or deviation on the basis of the image signals between the joint points in a pair of subject images only for the joint points having at least a certain level of estimation accuracy or reliability.

Instead of deriving an image feature quantity vector for each joint point, the motion trajectory estimating unit 33 may derive an image feature quantity vector for each rectangular or polygonal subject area including a subject image. The motion trajectory estimating unit 33 may derive the image feature quantity vectors for each rectangular subject area using a latent space vector of a convolutional neural network (CNN) trained using a specific data set.

The motion trajectory estimating unit 33 may derive a final similarity or deviation degree on the basis of both the degree of similarity or deviation derived on the basis of the coordinates (two-dimensional) of joint points in frames and the degree of similarity or deviation derived on the basis of the image signals (image feature quantities) between joint points in a pair of subject images.

The motion trajectory estimating unit 33 derives the degree of similarity or deviation only on the basis of pairs of subject images whose distance between time series frames is equal to or less than a certain level. More specifically, the degree of similarity or deviation does not have to be defined in pairs of subject images where their distance between the time series frames is greater than the certain level. When deriving the degree of similarity, the motion trajectory estimating unit 33 may give a prescribed minimum distance to a pair of subject images whose distance between the time series frames exceeds a certain value. When deriving the degree of deviation, the motion trajectory estimating unit 33 may give a prescribed maximum distance to a pair of subject images whose distance between time series frames exceeds a certain value.

The distance between subject images between time series frames may be the distance between representative joint points determined in the subject images. The distance between subject images may be the average of the distances between common joint points in the pair of subject images between time series frames. The distance between subject images may also be derived using the area of the common area in the subject area between time series frames.

When deriving a pair (corresponding) of subject images between time-series frames in step S103, the motion trajectory estimating unit 33 may derive images of wrong subjects as the pair when multiple subjects from the camera 2 appear to touch or overlap each other. In such a case, in deriving a pair (corresponding) of subject images between time series frames in step S103, the motion trajectory estimating unit 33 may change the degree of similarity or deviation for some of pairs of subject images in order to preferentially reduce the possibility of deriving a wrong pair of subject images even when the possibility of deriving a correct pair of subject images is reduced. For example, when a degree of similarity equal to or higher than a certain value or a degree of deviation equal to or lower than a certain value is derived between an image of one subject in the first frame and an image of a plurality of subjects in a second frame, the motion trajectory estimating unit 33 may change the degree of similarity or deviation about at least one pair of images of the plurality of subject images to an undefined state. When a degree of similarity equal to or higher than a certain value is derived between an image of one subject in the first frame and an image of a plurality of subjects in the second frame, the motion trajectory estimating unit 33 may change the distance between at least one pair of subject images to a prescribed minimum distance. When a degree of deviation equal to or less than a certain value is derived between an image of one subject in the first frame and an image of a plurality of subjects in the second frame, the motion trajectory estimating unit 33 may change the distance between at least one pair of subject images to a prescribed maximum distance. In this way, as for some of the subject images, a pair of subject images (corresponding) between time series frames does not have to be derived. Similarly, as for some of subject images, a pair of subject images between time series frames may be interrupted in the temporal direction.

When a degree of similarity equal to or higher than a certain value or a degree of deviation equal to or less than a certain value is derived between an image of a single subject and an image of a plurality of subjects, the distance between subject images may not be changed. For example, when the ratio of the derived maximum similarity degree to the second largest similarity is equal to or greater than a threshold value, the motion trajectory estimating unit 33 may change the distance between the subject images. For example, when the ratio of the derived minimum deviation to the second smallest deviation is equal to or greater than a threshold value, the motion trajectory estimating unit 33 may change the distance between the subject images.

Note that information representing a set of trajectories of each joint point determined in a subject image includes an identifier of a camera, a start frame number, an end frame number, and a set of coordinates of the joint point from the start frame to the end frame.

The inter-camera correspondence estimating unit 34 estimates a group of trajectories (corresponding) between frames respectively obtained from the cameras 2 (step S104). The method for estimating a group of trajectories (corresponding) by the inter-camera correspondence estimating unit 34 is not limited to any specific method. The inter-camera correspondence estimating unit 34 may estimate a group of trajectories (corresponding) between frames obtained from the cameras 2 for example by the operation illustrated in FIG. 5.

The parameter estimating unit 35 estimates a camera parameter for each of the cameras 2 on the basis of a group of trajectories (step S105). When there is a plurality of groups of trajectories, the parameter estimating unit 35 may estimate a camera parameter for each of the cameras 2 on the basis of a set of groups of trajectories.

For example, according to a group of trajectories in a camera 2, a group of coordinates of the same joint point determined in the same subject image in the same frame is obtained. Therefore, the parameter estimating unit 35 derives a set of corresponding points for each pair of cameras included in the cameras 2. The parameter estimating unit 35 uses an 8-point algorithm (reference document 3: Richard Hartley and Andrew Zisserman, "Multiple View Geometry in Computer Vision Second Edition", Cambridge University Press, 2003) to derive a fundamental matrix for each pair of cameras 2. The parameter estimating unit 35 may derive a camera parameter for each of the cameras 2 by decomposing the derived fundamental matrix.

For example, the parameter estimating unit 35 may use the camera parameter of each of the cameras 2 and the coordinates (three-dimensional) of a joint point of a subject in a three-dimensional space at each time (frame) as parameters. The parameter estimating unit 35 may derive the camera parameters by non-linear optimization on the basis of bundle adjustment (reference document 4: Bill Triggs, et al., "Bundle Adjustment—a Modern Synthesis", ICCV99, Proceedings of the International Workshop on Vision Algorithms: Theory and Practice, Springer, pp. 298-372, 1999). In other words, the parameter estimating unit 35 may derive the camera parameters for each of the cameras 2 so that the error (reprojection error) between the estimated observation coordinates of a joint point of a subject in a three-dimensional space at each of the cameras 2 and the actual observation coordinates of the joint point at each of the cameras 2 included in a group of trajectories is minimized.

Figure 5:
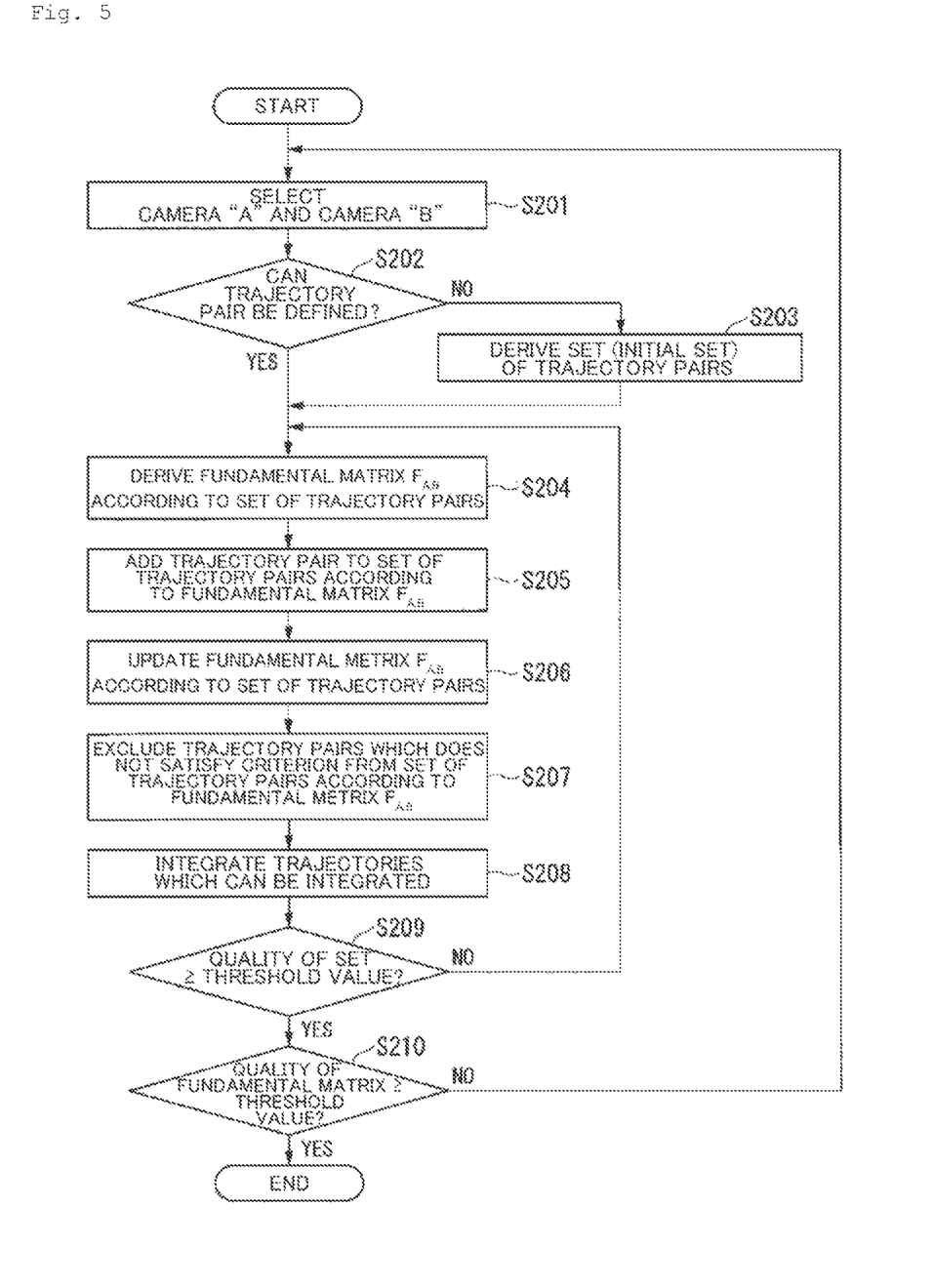
FIG. 5 is a flowchart for illustrating exemplary operation for estimating a group of trajectories according to the embodiment.

FIG. 5 is a flowchart for illustrating exemplary operation for estimating a group of trajectories (details in step S104). The inter-camera correspondence estimating unit 34 selects cameras 2 to be paired from N cameras 2 using an arbitrarily determined criterion (step S201). In the following description, a first camera 2 of the paired cameras 2 will be denoted with "A". The second camera 2 of the paired cameras 2 will be denoted with "B".

For example, the inter-camera correspondence estimating unit 34 may select a pair of cameras 2 in the descending order of the maximum length of the trajectory of a representative point among a plurality of joint points in time series frames. The inter-camera correspondence estimating unit 34 may select a pair of cameras 2 in the descending order of the maximum value of the area covered by the trajectory of a joint point in time series frames. Note that the inter-camera correspondence estimating unit 34 may select a pair of cameras 2 in the descending order of the total area covered by the trajectory of a joint point in time series frames. The area covered by the trajectory of a joint point is the area of the minimum rectangular area that includes all the joint points that make up the trajectory. The area covered by the trajectory of a joint point may be the area of the minimum rectangular area that includes representative joint points of the trajectory.

When a set of trajectory pairs (corresponding) between paired cameras 2 has already been derived with an accuracy equal to or greater than a threshold value, the inter-camera correspondence estimating unit 34 may exclude the cameras 2 of the pair from the candidates. This allows the inter-camera correspondence estimating unit 34 to reduce the number of processing steps.

The inter-camera correspondence estimating unit 34 determines whether a pair of trajectories can be defined (set) between the selected paired cameras 2 (step S202).

When a pair of trajectories cannot be defined (NO in step S202), the inter-camera correspondence estimating unit 34 derives a set of trajectory pairs (an initial set) between the cameras 2 "A" and 2 "B" of the selected pair (step S203).

The method for deriving the initial set of trajectory pairs is not limited to any particular method if the initial set of likely trajectory pairs can be derived. For example, the inter-camera correspondence estimating unit 34 may evaluate the likelihood of a pair of trajectories for all of the pairs of trajectories between the paired cameras 2. The method for deriving the likelihood of a pair of trajectories is not limited to any particular method. For example, when the correspondence among other trajectories is obtained using the fundamental matrix between cameras obtained by assuming a pair of trajectories, the number of joint points for which correspondence is obtained within a prescribed error range may be considered as the likelihood of the pair of trajectories. The ratio of joint points having correspondence obtained relative to all the joint points may be determined as the likelihood of a trajectory pair. The inter-camera correspondence estimating unit 34 may include a certain number of pairs of trajectories in the initial set of trajectory pairs in descending order of evaluation levels. The inter-camera correspondence estimating unit 34 may include all the pairs of trajectories having an evaluation level equal to or higher than a criterion in the initial set of trajectory pairs. The inter-camera correspondence estimating unit 34 selects at least one pair of trajectories and includes the selected pair in the initial set of trajectory pairs. The inter-camera correspondence estimating unit 34 proceeds to step S204.

When a set of trajectory pairs can be defined between the selected pair of cameras 2 "A" and 2 "B" (YES in step S202), the inter-camera correspondence estimating unit 34 derives a set of pairs of joint points that are common in frames which are common among the pairs of trajectories as a set of corresponding points. On the basis of the set of pairs of joint points (the set of corresponding points), the inter-camera correspondence estimating unit 34 derives a fundamental matrix "$F_{A,B}$" between the selected pair of cameras 2 "A" and 2 "B" (step S204).

In the fundamental matrix "$F_{A,B}$" between the paired cameras 2 "A" and 2 "B", "$p_A{}^T F_{A,B} p_B = 0$" is established when the point "$p_A$" in a frame obtained from the camera "A" and the point "$p_B$" in a frame obtained from the camera "B" represent the same point (the corresponding point) in a three-dimensional space. Here, "$p^T$" represents the transposed vector of vector p. The method for deriving the fundamental matrix is not limited to any particular method. For example, the inter-camera correspondence estimating unit 34 derives the fundamental matrix "$F_{A,B}$" using an 8-point algorithm. The inter-camera correspondence estimating unit 34 may combine robust estimation such as RANSAC with an 8-point algorithm to derive the fundamental matrix "$F_{A,B}$".

The inter-camera correspondence estimating unit 34 adds the pair of trajectories between the paired cameras 2 "A" and 2 "B" to the set of trajectory pairs on the basis of the fundamental matrix "$F_{A,B}$" (step S205). In other words, the inter-camera correspondence estimating unit 34 adds the pair of trajectories between the cameras 2 "A" and 2 "B" as a pair newly associated using the fundamental matrix to the set of trajectory pairs. The method for adding the pair of trajectories to the set of trajectory pairs (updating the set of trajectory pairs) is not limited to any particular method.

For example, the inter-camera correspondence estimating unit 34 may add, to the set of trajectory pairs, a pair of trajectories that satisfies a prescribed condition for all combinations of trajectories in a time-series frame obtained from the camera 2 "A" and trajectories in a time-series frame obtained from the camera 2 "B".

For example, among a plurality of corresponding points derived on the basis of a pair of trajectories, a pair of trajectories, for which the ratio of the number of corresponding points determined to be mismatched using the fundamental matrix is less than a prescribed ratio, may be added to the set of trajectory pairs.

On the basis of the updated set of trajectory pairs, the inter-camera correspondence estimating unit 34 derives a set of pairs of joint points that are common among frames that are common among the pairs of trajectories as a set of correspondence points. The inter-camera correspondence estimating unit 34 derives the fundamental matrix "$F_{A,B}$" on the basis of the set of pairs of joint points (the set of corresponding points) as in step S204. In this way, the inter-camera correspondence estimating unit 34 updates the fundamental matrix "$F_{A,B}$" (step S206).

The inter-camera correspondence estimating unit 34 re-evaluates the pairs of trajectories included in the set of trajectory pairs on the basis of the updated fundamental matrix "$F_{A,B}$". The method for re-evaluating the trajectory pairs is not limited to any particular method. For example, the inter-camera correspondence estimating unit 34 re-evaluates the trajectory pairs by performing the same method as that in step S205. When performing the same method as that in step S205, the inter-camera correspondence estimating unit 34 may re-evaluate the pairs of trajectories after changing only the criterion. The inter-camera correspondence estimating unit 34 excludes the pairs of trajectories that do not satisfy the criterion from the set of trajectory pairs on the basis of the fundamental matrix "$F_{A,B}$" (step S207).

The inter-camera correspondence estimating unit 34 integrates trajectories on the basis of the set of trajectory pairs (step S208). For example, when a plurality of trajectories in a frame obtained from the camera 2 "A" is associated with a single trajectory in a frame obtained from the camera 2 "B", the inter-camera correspondence estimating unit 34 integrates the plurality of trajectories in the frame obtained from the camera 2 "A" into a single trajectory. Similarly, when a plurality of trajectories in a frame obtained from the camera 2 "B" are associated with a single trajectory in a frame obtained from the camera 2 "A", the inter-camera correspondence estimating unit 34 integrates the multiple trajectories in the frame obtained from the camera 2 "B" into a single trajectory. Note that the inter-camera correspondence estimating unit 34 also performs integration for trajectories other than those from the camera 2 "A" and camera 2 "B". In other words, for example, when one-to-many correspondence occurs for trajectories by cameras other than the camera 2 "B" due to integration of multiple trajectories from the camera 2 "A" into one, the inter-camera correspondence estimating unit 34 performs integration of the trajectories.

The inter-camera correspondence estimating unit 34 determines whether the quality of the set of trajectory pairs is at least equal to a threshold value (step S209). The method for determining the quality of the set of trajectory pairs is not limited to any particular method. For example, the inter-camera correspondence estimating unit 34 determines that the quality of a set of trajectory pairs is equal to or higher than a threshold value when the number of times of processing carried out from step S204 to step S208 is equal to or higher than a threshold value. The inter-camera correspondence estimating unit 34 may determine that the quality of a set of trajectory pairs is equal to or higher than a threshold value when the number of joint points included in the set of trajectory pairs is equal to or higher than a threshold value. The inter-camera correspondence estimating unit 34 may determine that the quality of a set of trajectory pairs is equal to or higher than a threshold value when the ratio of the number of joint points included in the set of trajectory pairs to the number of all joint points in the frame is equal to or higher than a threshold value.

When it is determined that the quality of the set of trajectory pairs is less than the threshold value (NO in step S209), the inter-camera correspondence estimating unit 34 returns to processing in step S204. When it is determined that the quality of the set of trajectory pairs is equal to or higher than the threshold value (YES in step S209), the inter-camera correspondence estimating unit 34 determines whether the quality of the fundamental matrix is at least equal to the threshold value for the fundamental matrixes for all pairs of cameras (step S210).

The method for determining whether the quality of the fundamental matrix is at least equal to a threshold value is not limited to any particular method. For example, when the number of times of processing from step S201 to step S209 which has been carried out for the paired cameras 2 corresponding to the fundamental matrix "$F_{A,B}$" is equal to or greater than a threshold value, it is determined that the qualities of all fundamental matrixes "$F_{A,B}$" are equal to or greater than the threshold value. The inter-camera correspondence estimating unit 34 may determine whether the quality of the fundamental matrix "$F_{A,B}$" is at least equal to the threshold value on the basis of the ratio of the percentage of mismatches in the latest fundamental matrix to the percentage of mismatches in the fundamental matrix updated by addition of a pair of trajectories.

When it is determined that the quality of any of the fundamental matrixes is less than the threshold value (NO in step S210), the inter-camera correspondence estimating unit 34 returns to processing in step S201. When it is determined that the qualities of all the fundamental matrices are equal to or greater than the threshold value (YES in step S210), the inter-camera correspondence estimating unit 34 ends the processing shown in FIG. 5.

As in the foregoing, the obtaining unit 30 according to the embodiment obtains, for each of the cameras 2, a time-series frame including an image of a plurality of subjects existing in a common field of vision shared by the multiple cameras 2. The point estimating unit 32 estimates, for each subject image, the coordinates of joint points determined in subject images in time-series frames. The motion trajectory estimating unit 33 estimates the trajectory of a joint point (the motion trajectory of a subject) between time series frames for each of the cameras 2. The inter-camera correspondence estimating unit 34 estimates a trajectory group between frames obtained respectively from the pair of cameras 2. The parameter estimating unit 35 estimates a camera parameter for each camera on the basis of the group of trajectories between the frames obtained respectively from the pair of cameras 2.

In this way, in order to estimate the coordinates of joint points determined in subject images in time-series frames (two-dimensional images) obtained from the cameras 2, the trajectories (motion trajectories) of the joint points determined in the subject images between the time-series frames are used. This allows camera parameters to be estimated with at least a certain level of accuracy even when multiple subjects are present in a common field of vison shared by multiple cameras.

As for any of subject images, even when subject images between time series frames are interrupted in the temporal direction, the inter-camera correspondence estimating unit 34 restores the connection of the subject images in the temporal direction simultaneously in the process of estimating the inter-camera correspondence between the trajectories of the joint positions of the subject, so that camera parameters can be robustly estimated even when it is difficult to track the subject within a single camera.

The embodiment of the invention has been described in detail with reference to the drawings, but specific configurations are not limited by the embodiment and include designs and the like which do not depart from the scope and gist of the invention.

INDUSTRIAL APPLICABILITY

The present invention is applicable to a device for estimating camera parameters representing the position and direction of a camera that captures moving images.

REFERENCE SIGNS LIST

1 Camera parameter estimating system
2 Camera
3 Camera parameter estimating device
30 Obtaining unit
31 Storage unit
32 Point estimating unit
33 Motion trajectory estimating unit 34 Inter-camera correspondence estimating unit
35 Parameter estimating unit
100 Processor
200 Communicating unit
300 Frame
310 Subject image
311 Subject area
312 Joint point
320 Subject image
321 Subject area
322 Joint point
400 Frame
410 Subject image
411 Subject area
420 Subject image
421 Subject area
422 Joint point

The invention claimed is:

1. A camera parameter estimating device comprising:
an obtaining unit which obtains time series frames from a plurality of cameras, wherein each camera captures its time-series frames including a plurality of subject images existing in a common field of vision shared by the cameras;
a point estimating unit which estimates coordinates of a joint point determined in the subject image in the time-series frame for each of the subject images;
a motion trajectory estimating unit which estimates a trajectory of the joint point between the time-series frames for each of the cameras according to the coordinates;
an inter-camera correspondence estimating unit which estimates a group of the trajectories between the frames obtained respectively from a pair of the cameras and derives a fundamental matrix between the pair of cameras according to the group of the trajectories; and
a parameter estimating unit which estimates a camera parameter for each of the cameras according to the group of trajectories thereby performing camera calibration according to the group of the trajectories.

2. The camera parameter estimating device according to claim 1, wherein
the inter-camera correspondence estimating unit updates the group of trajectories according to the derived fundamental matrix, and
the parameter estimating unit estimates a camera parameter for each of the cameras according to the updated group of trajectories.

3. The camera parameter estimating device according to claim 1, wherein
the inter-camera correspondence estimating unit integrates a plurality of the trajectories in the frames according to the group of trajectories between the frames obtained respectively from the pair of the cameras.

4. The camera parameter estimating device of claim 1, wherein the joint points include at least one of a neck, a hip, and a head.

5. The camera parameter estimating device of claim 1, wherein a neural network estimates the coordinates of the joint point.

6. The camera parameter estimating device of claim 1, wherein the group of trajectories includes a set of trajectory pairs and the inter-camera correspondence estimating unit determines whether a quality of the set of trajectory pairs is at least equal to a threshold value.

7. The camera parameter estimating device of claim 6, wherein the quality is a number of joint points included in the set of trajectory pairs.

8. The camera parameter estimating device of claim 6, wherein the quality is a ratio of a number of joint points included in the set of trajectory pairs to a number of total number of joint points in a frame.

9. The camera parameter estimating device of claim 1, wherein the camera parameter is an external parameter selected from the group consisting of: a position of the camera, a direction of the camera, and combinations thereof.

10. The camera parameter estimating device of claim 1, wherein the camera parameter is an internal parameter selected from the group consisting of: a focal length, a position of an optical center, a shear coefficient, and combinations thereof.

11. The camera parameter estimating device of claim 1, wherein the camera parameter is a lens distortion parameter.

12. A parameter estimating method carried out by a camera parameter estimating device, comprising:
obtaining, for each of multiple cameras, time-series frames including a plurality of subject images existing in a common field of vision shared by the multiple cameras;
estimating, for each of the subject images, coordinates of a joint point determined in the subject image in the time-series frame;
estimating a trajectory of the joint point between the time-series frames for each of the cameras according to the coordinates;
estimating a group of the trajectories between the frames respectively obtained from a pair of the cameras;
deriving a fundamental matrix between the pair of the cameras according to the group of the trajectories; and
estimating a camera parameter for each of the cameras according to the group of trajectories thereby performing camera calibration according to the group of trajectories.

13. The method of claim 12, further comprising:
updating the group of trajectories according to the derived fundamental matrix; and
estimating the camera parameter for each of the cameras according to the updated group of trajectories.

14. The method of claim 12, further comprising integrating a plurality of the trajectories in the frames according to the group of trajectories between the frames obtained respectively from the pair of cameras.

15. A camera parameter estimating system comprising:
a plurality of cameras;
a processor; and
a storage medium having computer program instructions stored thereon, when executed by the processor, perform to:
for each of the cameras, obtain time series frames including a plurality of subject images existing in a common field of vision shared by the cameras;
for each of the subject images, estimate coordinates of a joint point determined in the subject image in the time-series frames;
for each of the cameras, estimate a trajectory of the joint point between the time-series frames according to the coordinates;
estimate a group of the trajectories between the frames obtained respectively from a pair of the cameras;
derive a fundamental matrix between the pair of cameras according to the group of the trajectories; and estimate a camera parameter for each of the cameras according to the group of trajectories thereby performing a camera calibration according to the group of trajectories.

16. The camera parameter estimating system of claim 15, wherein the program instructions further perform to:
update the group of trajectories according to the derived fundamental matrix; and
estimate the camera parameter for each of the cameras according to the updated group of trajectories.

17. The camera parameter estimating system of claim 15, wherein the program instructions further perform to integrate a plurality of the trajectories in the frames according to the group of trajectories between the frames obtained respectively from the pair of cameras.

* * * * *